(12) United States Patent
Lambert et al.

(10) Patent No.: US 6,945,477 B2
(45) Date of Patent: Sep. 20, 2005

(54) CRYOGENIC COUPLING DEVICE

(75) Inventors: Todd D. Lambert, Brooklyn Park, MN (US); Keith J. Anderson, Maple Grove, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 201 days.

(21) Appl. No.: 10/618,198

(22) Filed: Jul. 11, 2003

(65) Prior Publication Data

US 2004/0050450 A1 Mar. 18, 2004

Related U.S. Application Data

(60) Provisional application No. 60/408,388, filed on Sep. 4, 2002.

(51) Int. Cl.[7] .......................... B05B 15/00; B05B 15/08
(52) U.S. Cl. ................. 239/542; 239/587.1; 239/587.2; 239/587.3; 239/600
(58) Field of Search .............................. 239/542, 587.1, 239/587.2, 587.3, 587.4, 587.5, 600, 589, 597, 569, 451

(56) References Cited

U.S. PATENT DOCUMENTS

| | | |
|---|---|---|
| 2,461,705 A | 2/1949 | Stranberg |
| 3,472,482 A | 10/1969 | Gardner |
| 3,637,050 A * | 1/1972 | Hoffmeister ................ 433/132 |
| 3,664,634 A | 5/1972 | Guertin et al. |
| 3,842,614 A | 10/1974 | Kurcher et al. |

(Continued)

FOREIGN PATENT DOCUMENTS

| | | |
|---|---|---|
| DE | 1475880 | 2/1969 |
| EP | 0371867 | 11/1993 |
| EP | 0899274 | 1/1999 |
| WO | 84/02171 | 6/1984 |
| WO | 87/07535 | 12/1987 |

OTHER PUBLICATIONS

Parker Fluid Connectors—Alternative Fuel Products for LNG Nozzles. Applicants request the Examiner to consider this reference as prior art under 102(a), however, Applicants respectfully reserve the right to supplement this Information Disclosure Statement and take a contrary position should it be necessary.

J.C. Carter Company—Leak Free Single Line Cryogenic Fuel Coupling, Models 50E700A and 50E701. Applicants request the Examiner to consider this reference as prior art under 102(a), however, Applicants respectfully reserve the right to supplement this Information Disclosure Statement and take a contrary position should it be necessary.

J.C. Carter Company—Leak Free Small Single Line Cryogenic Fuel Coupling, Models 50 E721 and 50 E722. Applicants request the Examiner to consider this reference as prior art under 102(a), however, Applicants respectfully reserve the right to supplement this Information Disclosure Statement and take a contrary position should it be necessary.

*Primary Examiner*—Davis Hwu
(74) *Attorney, Agent, or Firm*—Christopher H. Hunter

(57) ABSTRACT

A cryogenic coupling device includes a valved receptacle and a valved nozzle. Rollers in an outer collar of the receptacle are received in helical channels along a collar of the nozzle. A notch or detent in each of the channels provides a vent position to vent fluid before the nozzle is fully disconnected from the receptacle. Interface seals on the nozzle include first and second annular seals that function as ice and containment scrapers, as well as fluid seals. The nozzle has a rotatable handle assembly, isolated from the fluid path, which provides easy connect and disconnect of the nozzle from the receptacle. The handle assembly includes a thermal break, and is easily removable from the nozzle, along with other parts of the nozzle and receptacle, for service and maintenance.

19 Claims, 6 Drawing Sheets

U.S. PATENT DOCUMENTS

| | | |
|---|---|---|
| 3,874,411 A | 4/1975 | Vik |
| 3,897,091 A | 7/1975 | McMath et al. |
| 4,030,524 A | 6/1977 | McMath et al. |
| 4,374,870 A | 2/1983 | Sandgren et al. |
| 4,567,924 A | 2/1986 | Brown |
| 4,676,269 A | 6/1987 | Sarson |
| 4,962,886 A * | 10/1990 | Stockel ................. 239/11 |
| 5,265,844 A | 11/1993 | Westfall |
| 5,404,909 A | 4/1995 | Hanson |
| 5,429,155 A | 7/1995 | Brzyski et al. |
| 5,560,548 A | 10/1996 | Mueller et al. |
| 6,082,400 A | 7/2000 | Tocha |
| 6,142,194 A | 11/2000 | McClaran |
| 6,155,294 A | 12/2000 | Cornford et al. |
| 6,202,421 B1 | 3/2001 | Maguire et al. |
| 6,302,147 B1 | 10/2001 | Rose et al. |
| 6,405,768 B1 | 6/2002 | McClaran |

\* cited by examiner

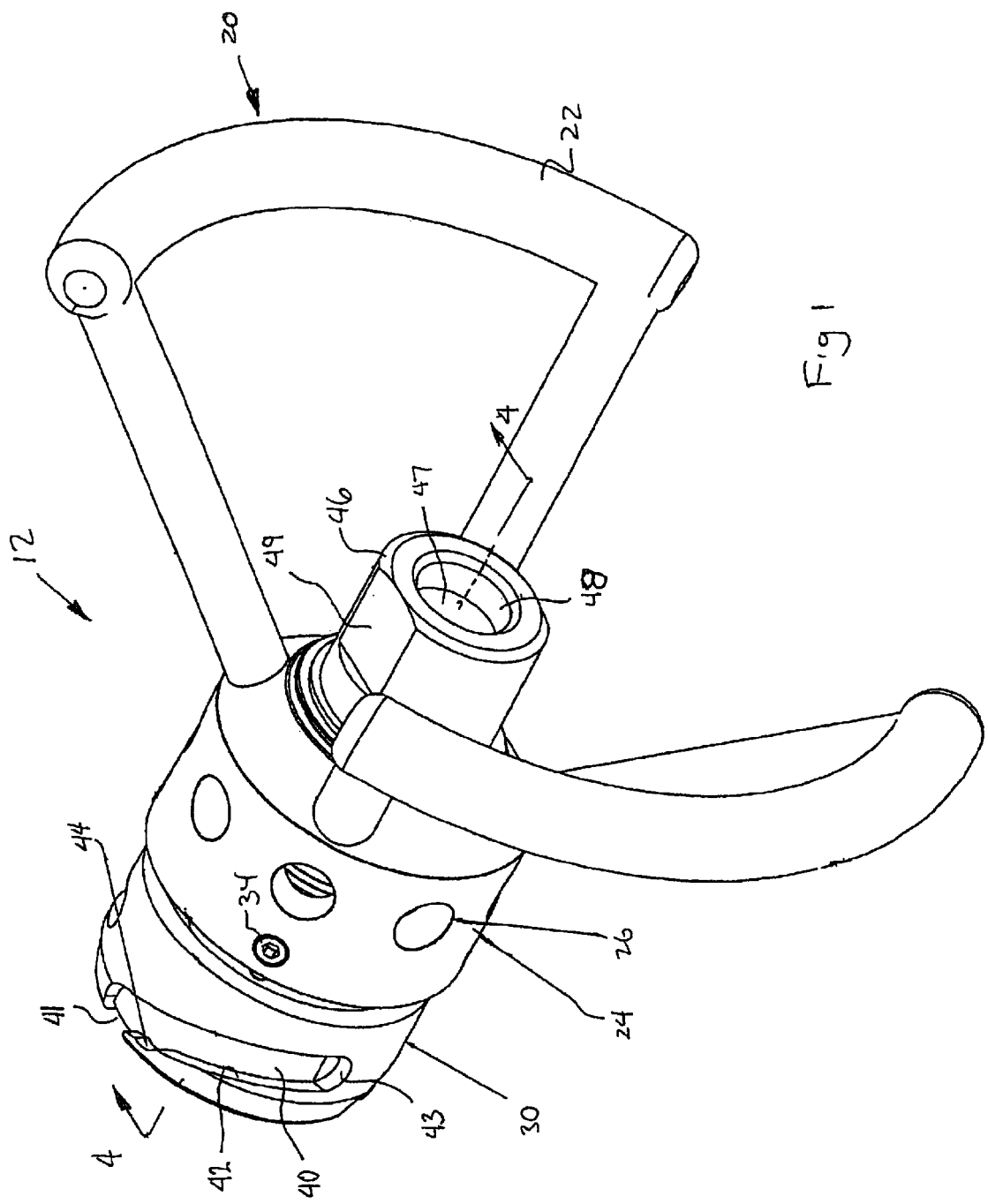

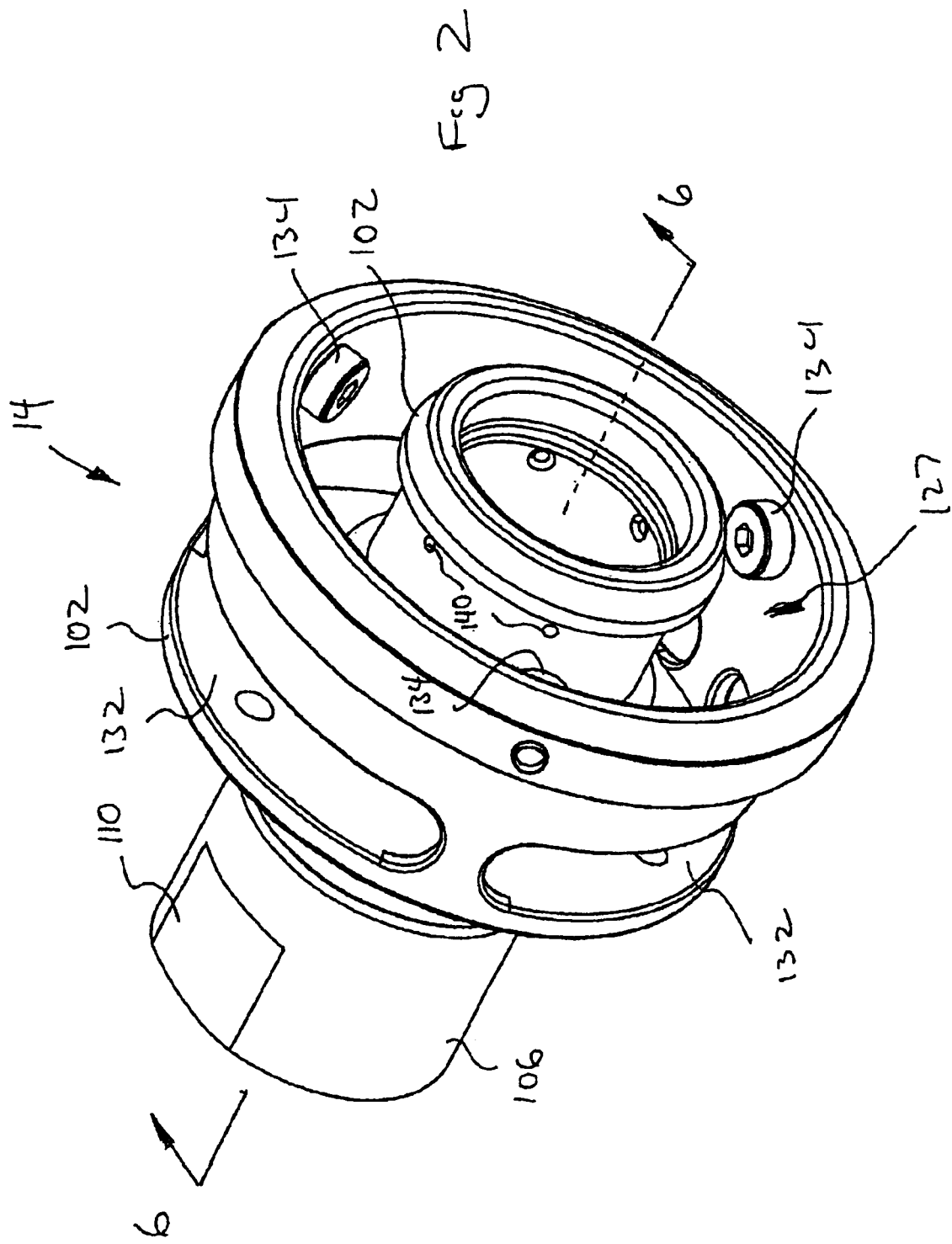

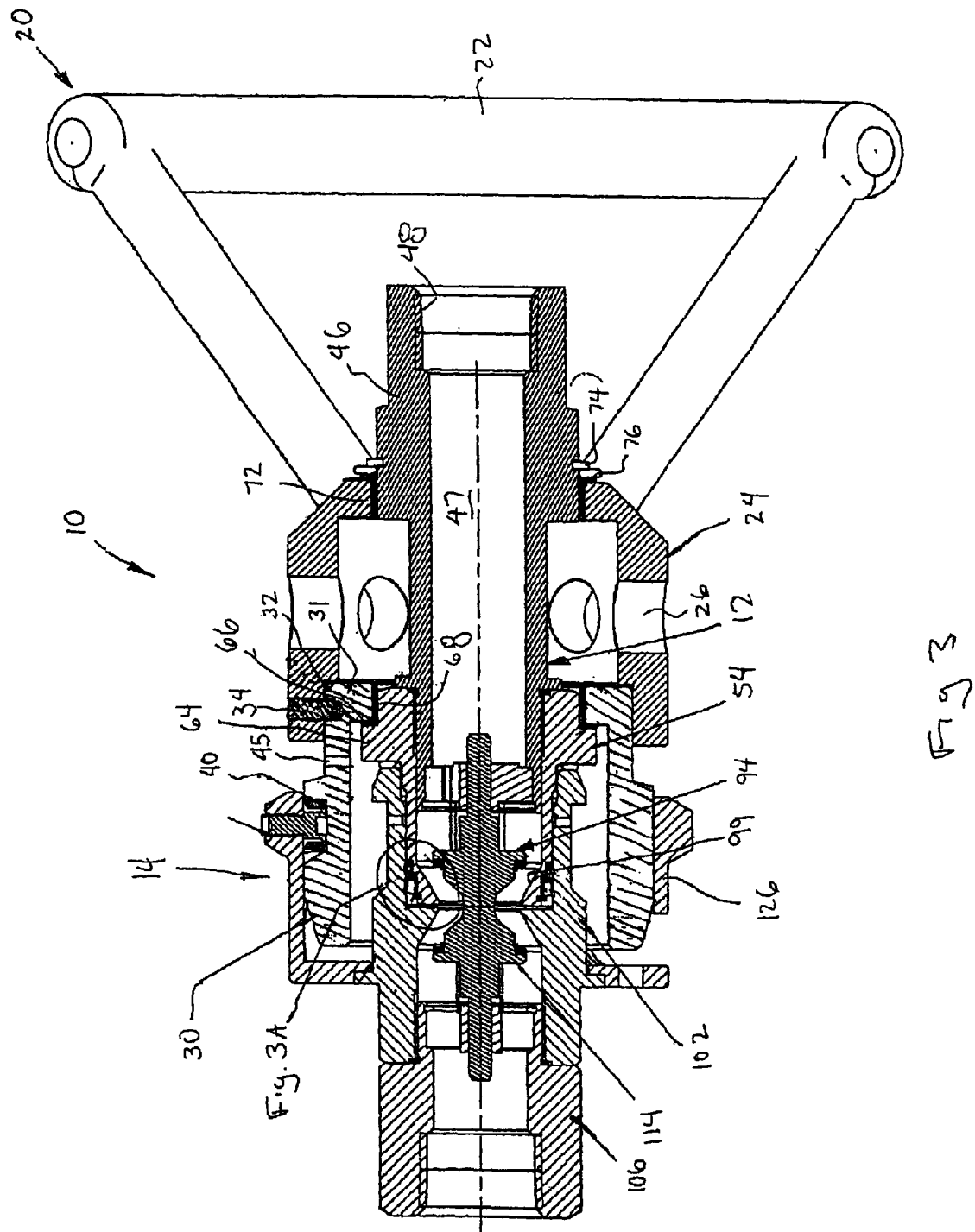

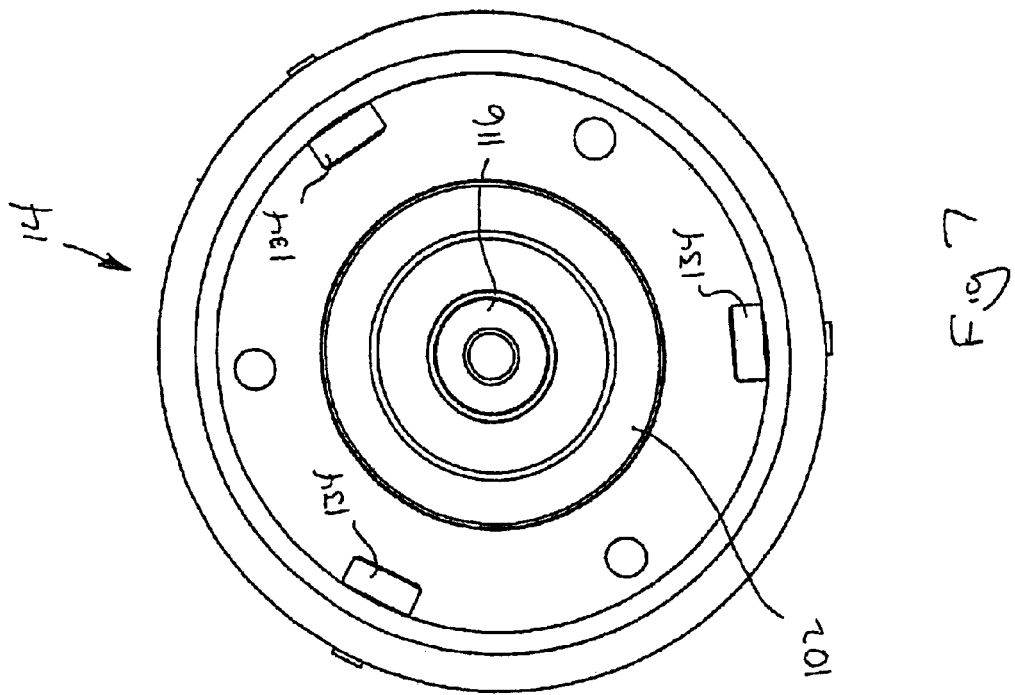
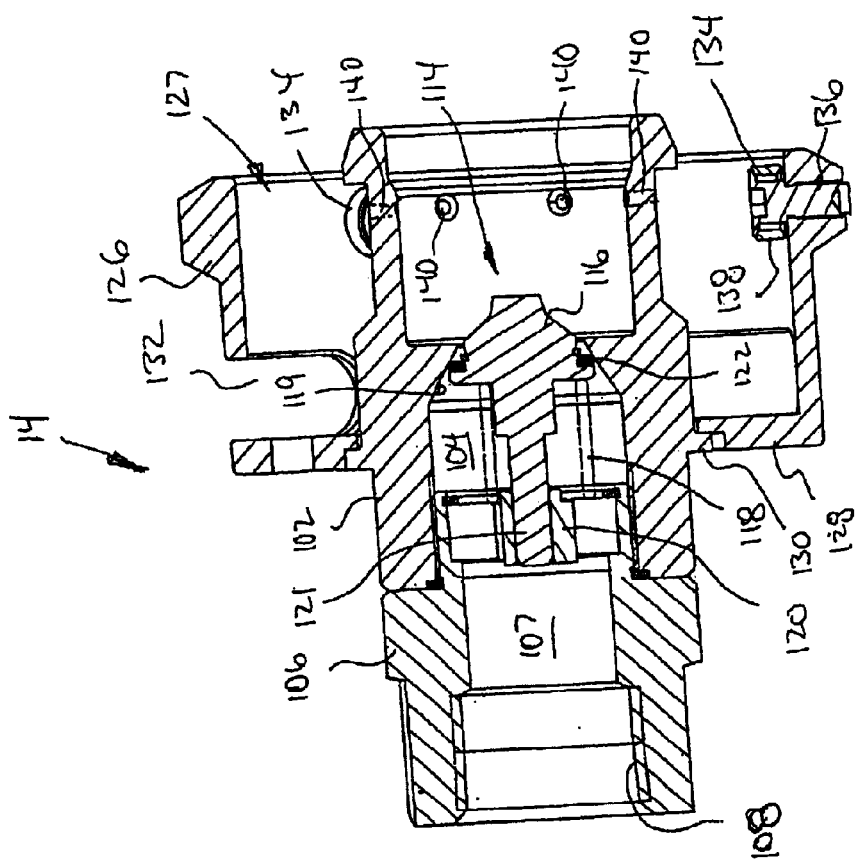

CRYOGENIC COUPLING DEVICE

CROSS-REFERENCE TO RELATED CASES

The present application claims the benefit of the filing date of U.S. Provisional Application Ser. No. 60/408,388; filed Sep. 4, 2003, the disclosure of which is expressly incorporated herein by reference.

FIELD OF THE INVENTION

The present invention relates generally to valved nozzles which mate with valved receptacles to transfer fluids such as cryogenic fluids.

BACKGROUND OF THE INVENTION

Coupling devices are known for transferring fluids from a storage tank into a mobile tank or other container such as found on an automobile, bus, truck, aircraft, etc. For certain fluids, for example, cryogenic fluids (e.g., liquid nitrogen, liquid argon, liquid oxygen), the coupling must be robust and able to withstand particularly difficult fueling environments (e.g., it must prevent coupling freeze-up). It is also important that the coupling prevent spills and have dimensions which minimize the clearance necessary for coupling the nozzle to the receptacle. It is further important that the coupling have ease of operation for various skill levels of operators, and be ergonomically friendly.

Certain nozzles and receptacles are known which substantially satisfy these demands and provide easy coupling and uncoupling of the nozzle from the receptacle. For example, a series of coupling devices available from the assignee of the present invention for liquid natural gas (LNG) applications include a valved nozzle and valved receptacle which are releasably interconnected by a locking collar, and have interface sealing surfaces to prevent fluid leakage. The nozzle interface sealing surface is arranged on a carrier that is axially slideable relative to the nozzle housing. The carrier also provides a valve seat for the nozzle valve. An actuator lever on the nozzle moves both the nozzle valve poppet toward and away from the nozzle valve seat as well as the nozzle interface sealing surface toward and away from the receptacle interface sealing surface. The interface sealing surfaces are brought together before the receptacle and nozzles valves are opened during connect, and are maintained together until after the valves are closed for disconnect. Any fluid trapped between the closed valves and the interface sealing surfaces is vented before disconnect as the actuator lever is moved to a disconnect position.

In such prior coupling, the receptacle includes an annular flange with radially-outward projecting lugs which are received in appropriately-spaced slots in the locking collar at the front end of the nozzle. When the locking collar is rotated, the lugs are engaged by the locking collar to retain the nozzle on the receptacle. It is also known to provide helical slots along the nozzle, which receive radially-outward projecting pins on the receptacle. Rotation of the locking collar on the nozzle (or of the nozzle itself in some designs) pulls the nozzle toward the receptacle for secure attachment. The open end of the nozzle internally receives the end of the receptacle.

Such a coupling device has received widespread acceptance in the marketplace. Nevertheless, the above described coupling device has a number of components which are fairly complicated, and require significant time and effort to manufacture and assemble, as well as to rebuild during normal repair and maintenance. The components are also fairly complicated to manufacture and assemble. In addition, while the interface seals of this coupling device are field-serviceable, it is believed there is a demand for improved interface seal design which is more reliable and does not require as frequent servicing and maintenance. It is therefore believed there is a demand in the industry for a further improved coupling device, particularly for fluids such as cryogenic fluids, which overcomes at least some of these drawbacks, and which retains many of the features and advantages of assignee's prior coupling designs. In addition, it is also believed there is a demand for different coupling structures to securely couple the nozzle to the receptacle, and which allow venting of the coupling before full disconnect.

SUMMARY OF THE INVENTION

The present invention thereby provides an improved coupling device, particularly suitable for cryogenic fluids, which is robust, able to withstand harsh fueling environments, prevents spills, has a small size to reduce the clearance necessary for coupling the nozzle to the receptacle, and has many of the other features and advantages of prior coupling devices, but which is also simpler and easier to manufacture and assemble; is easier to rebuild; and has an improved interface seal design with an extended service life. The coupling device also has a unique coupling structure which securely couples the nozzle to the receptacle and allows venting of the coupling before full disconnect.

According to the present invention, the receptacle has a poppet valve supported internally within an inner valve body; and an outer collar or sleeve, surrounding the inner valve body, within a series of bearings spaced circumferentially around an interior surface and projecting radially inward. The inner valve body and outer collar define a receiving cavity.

The nozzle also includes a valve body which internally supports a poppet valve, and which is received within the receiving cavity of the receptacle. A handle assembly including a nozzle collar is rotatably secured to the valve body of the nozzle. A series of helical channels are provided around the exterior surface of the nozzle collar. The channels are dimensioned to receive the bearings on the collar of the receptacle. Rotation of the handle assembly causes the nozzle to be pulled toward the receptacle for secure engagement. Upon connect, the poppet valves in the nozzle and the receptacle open to allow fluid flow therebetween.

The helical grooves on the nozzle include a geometry which retains the nozzle and receptacle in a vent position, to allow fluid to escape before full disconnect. This geometry is preferably a detent notch toward the outer end of the helical flights which retains the bearings until additional rotational effort is used to move the bearings entirely out of the groove.

The handle assembly of the nozzle includes channels or openings to allow air flow in and around the fitting—to prevent freeze-up of the coupling device during fueling. The rotatable handle assembly is also isolated from the fluid path to prevent heat transfer and freeze up around the points of rotation. The handle assembly can be easily removed from the valve body for service and maintenance by removal of a retaining ring.

The nozzle includes an interface seal which includes first and second annular seals that function as ice and containment scrapers, as well as fluid seals. The seals can be easily removed from the valve body by removing a retaining ring.

The bearings of the receptacle can also be easily removed for service and maintenance without disassembling the entire receptacle. The bearings are likewise isolated from the fluid path to prevent freeze up.

As such, the present invention provides an improved coupling device, particularly suitable for cryogenic fluids, which is robust, able to withstand harsh fueling environments, prevents spills, has a small size to reduce the clearance necessary for coupling the nozzle to the receptacle, and has many of the other features and advantages of prior coupling devices; and which is also simple and easy to manufacture and assemble; is easy to rebuild; and has an improved interface seal design with an extended service life. The coupling device also has a unique coupling structure which provides secure attachment of the nozzle to the receptacle, and allows venting of the coupling device before full disconnect.

Further features of the present invention will become apparent to those skilled in the art upon reviewing the following specification and attached drawings.

BRIEF DESCRIPTION OF THE DRAWINGS

FIG. 1 is an elevated perspective view of a nozzle for a coupling device constructed according to the principles of the present invention;

FIG. 2 is a elevated perspective view of a receptacle for the coupling device constructed according to the principles of the present invention;

FIG. 3 is a cross-sectional side view of the coupling device;

FIG. 6 is a cross-sectional side view of the receptacle taken substantially along the plane described by the lines 6—6 of FIG. 2; and FIG. 7 is an end view of the receptacle.

DETAILED DESCRIPTION OF THE PREFERRED EMBODIMENT

Figure 5:
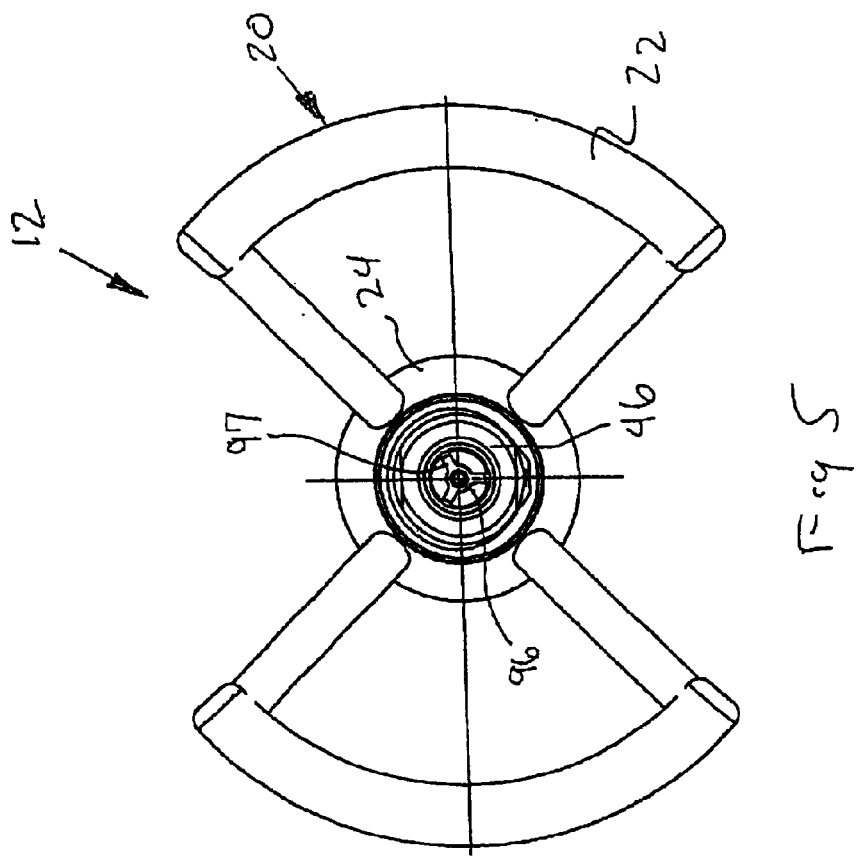
FIG. 5 is an end view of the nozzle.

Referring to the drawings and initially to FIGS. 1–3, a coupling device is indicated generally at 10, and includes a nozzle, indicated generally at 12, and a receptacle, indicated generally at 14. The nozzle 12 and receptacle 14 are formed of appropriate materials, such as hardened stainless steel. The coupling device of the present invention is particularly useful for coupling together fluid lines for use in transferring fluid such as cryogenic fluids, from one tank or container to another; however, it should be appreciated that the present invention could be used for a variety of fluids and is not necessarily limited to cryogenic fluids. Likewise, although the coupling device is particularly useful for coupling together fluid lines for use in transferring fluid from a storage tank to a mobile tank or container such as found on a vehicle or aircraft, these are only a few examples of such use, and the coupling device could be used in a wide variety of applications to transfer fluid from one location to another.

With the above in mind, in one application, the receptacle of the coupling device is incorporated into a bus or truck, and is connected by a fluid line to a tank on such a vehicle; while the nozzle is incorporated into a pump or other dispensing device and is likewise connected by a separate fluid line to a storage tank. When the tank on the vehicle needs to be refilled, the nozzle is used to introduce fresh fluid into the vehicle tank from the storage tank. To facilitate grasping and using the nozzle, the nozzle includes a handle assembly 20 including a gripping portion 22 of any appropriate configuration, and an annular sleeve 24. The gripping portion 22 and sleeve 24 can be fixed together in any appropriate manner, such as by welding or mechanical fastener. The annular sleeve includes one, and preferably a series of openings as at 26, which reduce the weight of the nozzle (preferably without any appreciable loss in strength) and allow air flow internally of the sleeve as will be described more fully below.

An annular collar 30 is located internally of sleeve 24 and has a radially-inward projecting flange 31 at its rear downstream end, which abuts against an internal shoulder 32 of the sleeve. The collar projects axially forward, externally of the sleeve, to a downstream end 33. Collar 30 is illustrated as being rotationally and axially fixed to the sleeve 24 using a series of screws 34 received in throughbores 35 in sleeve 24 and in corresponding threaded, blind-end bores 36 in collar 30, although collar 30 could alternatively be formed unitarily (or one piece) with sleeve 24. It is noted that in the first case, screws 34 can be easily removed if it is desired to remove sleeve 24 from collar 30, such as for servicing or repair, or for easy replacement of the gripping portion 22 with another style of gripping portion. In any case, nozzle collar 30 includes a series of helical (or spiral) channels 40 along the outer surface of the collar, and opening radially outwardly therefrom. Each channel is preferably identical, and has an entrance opening 41 at the downstream end 33 of the collar, sidewalls 42, and projects helically inward from the entrance opening to an end wall 43. Preferably, three of such channels 40 are provided, in evenly-spaced relation around the collar. A detent notch 44 is provided in an outer of the sidewalls 42 toward the outer end of each of the channels 40, proximate the entrance opening 41. The reasons for notch 44 will be described more fully below. The geometry (e.g., depth, width and length) of the channels will also be described more fully below.

A series of small openings as at 45 are provided around the circumference of the nozzle valve body to allow moisture and condensation therefrom.

The nozzle further includes an internal annular fitting 46 with an internal fluid passage 47 leading to a threaded end portion 48. The threaded end portion 48 is conventional and allows appropriate fluid lines (not shown) to be attached. Appropriate geometry 49 (e.g., flats) is provided on the exterior surface of the fitting to facilitate connection with the fluid lines. An annular valve body 54 is received about the downstream end of the fitting 46, and also has an internal fluid passage 55. The valve body 54 is rotationally and axially fixed to the fitting such as with a threaded connection as at 56. The valve body abuts a radially-outward projecting annular stop 58 of the fitting to properly axially locate the valve body with respect to the fitting. An O-ring 60 or other annular sealing device can be located between the inner end of the valve body and the annular stop of the fitting to ensure a fluid-tight seal therebetween.

The nozzle collar 30 and handle assembly 20 are fixed to the fitting 46 in a manner which allows relative rotational movement, as well as easy removal of the nozzle collar and handle assembly from the fitting. To this end, the valve body includes a radially-outward projecting annular flange 64 (FIG. 3) toward its upstream end which defines a shoulder 66. A bushing 68 is supported on the shoulder 66 and rotationally supports the annular flange 31 of the collar 30 (see, e.g., FIG. 3). A second bushing 72 is located between the fitting 46 and the rear upstream end of the sleeve 24. The bushings 68, 72 allow relative rotation of the handle assembly and collar with respect to the fitting and valve body, and are formed from an appropriate material, such as ultra high molecular weight polyethylene. The bushings also thermally isolate the handle assembly from the fitting, and the cold flow of fluid therethrough. The handle assembly 20 and collar 30 are axially retained on the fitting and valve body by abutting contact (supported again, by the bushing 68) between the downstream end surface of the annular flange 31 on the collar—and a retaining ring 74 at the upstream end of the sleeve 24. An annular washer 76 (formed from e.g., aluminum) is provided between the retaining ring 74 and the upstream end of the fitting to facilitate rotation.

As can be appreciated, once retaining ring 74 is removed, the handle assembly 20 and collar 30 can be removed (slid-off) from the fitting and valve body. The valve body 54 can then be accessed, and removed (unscrewed) from the fitting for repair and maintenance.

As should also be appreciated, while the handle assembly 20 and collar 30 are free to rotate relative to the fitting 46, they are also isolated from the fluid path through passage 47. As such, there is no potential for fluid leakage between the bushings. The sleeve 24 of the handle assembly 20 is radially outward spaced from the fitting 46, and openings 26 allow air flow around an extent of the fitting to maintain the fitting at appropriate temperatures during fueling, such as to prevent freeze-up of the bushings 68, 72, as well to prevent freeze-up of the remaining coupling structure of the nozzle and receptacle.

Figure 3A:
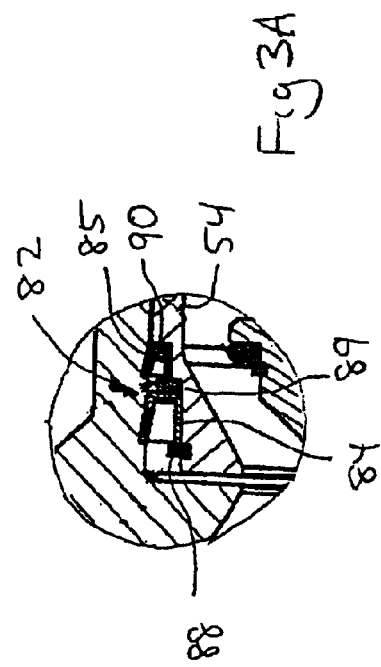
FIG. 3A is an enlarged view of a portion of the coupling device illustrated in FIG. 3.

The valve body 54 has a downstream end 80 with a tapered outer surface to facilitate insertion of the collar into the receptacle. Referring now to FIG. 3A, an interface seal, indicated generally at 82, is also supported on an exterior surface toward the downstream end of the valve body. The interface seal 82 preferably comprises a pair of annular sealing elements 84, 85, with downstream sealing element 84 being supported between a retaining ring 88 and a seal washer 89, and an upstream sealing element 85 being supported between the seal washer 89 and a shoulder 90 on the valve body 54. The downstream sealing element 84 preferably has an downstream-opening U or V-shaped configuration, and functions as an ice and containment scraper as well as a fluid seal. The upstream seal also preferably has a downstream-opening U or V-shaped configuration, but functions primarily as a fluid seal. The sealing elements 84, 85 are made from a material, such as ultra high molecular weight polyethylene or polytetrafluoroethylene, as appropriate for the particular application.

Figure 4:
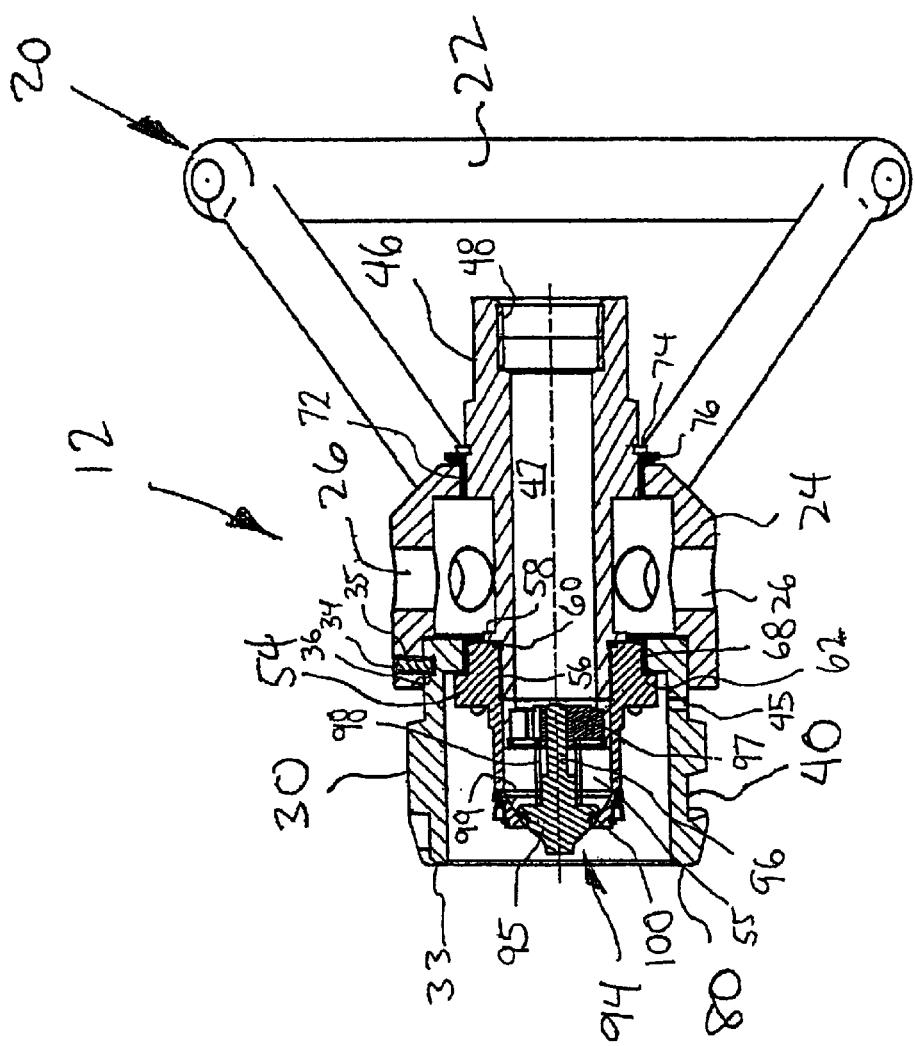
FIG. 4 is a cross-sectional side view of the nozzle taken substantially along the plane described by the lines 4—4 of FIG. 1.

Referring again to FIGS. 3 and 4, the valve body 54 supports an internal poppet valve, indicated generally at 94. Poppet valve 94 includes an enlarged valve head 95 with an axial post 96 which is moveably received in a spider or flange 97 (see also, FIG. 5) fixed to the downstream end of the fitting. A spring 98 biases the valve head forwardly/downstream in the valve body, against a valve seat 99. A seal 100 at the forward end of the valve head provides a fluid-tight seal with the valve seat when the poppet valve is closed (FIG. 4). When the poppet valve 94 is open (FIG. 3), flow is allowed through passage 47 in the fitting and passage 55 in the valve body. The above-described poppet valve is only one type of valve appropriate for the present invention, and it should be appreciated that other types of valves could likewise be used.

Referring now to FIGS. 2, 3, 6 and 7, the receptacle 14 also includes an annular valve body 102 having a central flow passage 104. A fitting 106 is fixed (such as by a threaded connection) to one end of the valve body and includes an internal fluid passage 107 leading to a conventional threaded end portion 108 to enable connection with an appropriate fluid line (not shown). Appropriate geometry 110 (e.g., flats) is provided on the exterior surface of the fitting to facilitate connection with the fluid lines.

A poppet valve, indicated generally at 114, is supported internally of the valve body 102. Poppet valve 114 preferably has the same structure and function as the poppet valve 94 described above, and includes an enlarged valve head 116 which is biased forwardly/upstream by spring 118 into sealing engagement with a second valve seat 119. A spider or flange 120 supports an axial post 121 of the poppet valve for axial movement. As with the first poppet valve, a seal 122 carried by the valve head provides a fluid tight seal with the valve seat when the poppet valve is in a closed position (FIG. 6). When the second poppet valve is open (FIG. 3), flow is allowed through fluid passage 104 in the fitting and passage 107 in the valve body of the receptacle.

An annular collar 126 likewise outwardly surrounds the valve body of the receptacle. The collar 126 and valve body 102 together define an annular receiving cavity, indicated generally at 127. Collar 126 has a radial flange 128 at one end which is fixed, such as by welding, to a short annular flange 130 on the receptacle valve body. A series of circumferentially-extending openings 132 are provided around the collar for weight reduction and to facilitate air flow around the receptacle and the nozzle during fueling.

The upstream end of the receptacle collar supports a series of bearings, as at 134. Bearings 134 are preferably also formed of appropriate material, such as hardened stainless steel, and are evenly spaced-apart around the inner surface of the collar, toward the open end of the receptacle. Each bearing includes a central, radially-extending post 136 threadably received in an opening in the wall of the collar, and an annular roller 138 carried by the radially inner end of the post (see, e.g., FIG. 6). Bearings 134 are dimensioned and spaced so as to be received in the entrance openings 41 of the helical channels 40 in the nozzle, and the helical channels 40 likewise have an appropriate width and depth to receive the rollers. The bearings smoothly ride along the sidewalls 42 of their respective channels to align and guide the nozzle and to pull the nozzle into secure attachment with the receptacle as the nozzle is rotated. The bearings ride in the channels until they abut end walls 43. The helical length of the channels is preferably such that the nozzle is fully secured to the receptacle after about 90° of rotation, however this can vary depending upon the particular application. The bearings can be easily accessed, and removed and replaced if necessary, by simply unscrewing the central posts 136 from the respective holes in the receptacle collar.

While roller bearings are preferred as the locking device to secure the nozzle to the receptacle, it should be appreciated that other bearing structures could be used; and in an even broader sense, that merely a series of radial projections, pins or other locking devices could be provided around the collar to ride up along the channels and bring the nozzle together with the receptacle.

A series of small openings as at 140 are provided around the circumference of the receptacle valve body to any trapped pressure to vent to atmosphere.

The channels (e.g., circumferential spacing of entrance openings, geometry (e.g., width), etc.) and/or roller bearings can be particularized ("keyed") for different fluids, to prevent accidental introduction of the wrong nozzle into a receptacle.

The valve body 102 of the receptacle has an internal dimension which closely receives the valve body 54 of the nozzle. The tapered downstream end of the nozzle valve body facilitates inserting the nozzle valve body into the receptacle valve body during connect. Upon connect, the nozzle is rotated, that is, the handle assembly 20 is grasped by the user and the handle assembly 20 and nozzle collar 30 are rotated while the fitting 46 and nozzle valve body 54 remain essentially stationary. As described above, the bearings 134 on the receptacle enter the entrance openings 41 of the helical channels 40 on the nozzle. Upon further rotation, the bearings 134 ride up along the helical channels, bringing the nozzle and the receptacle together. As the bearings ride up the channel, the interface seal 82 on the forward end of the nozzle valve body fluidly seals against the inner surface of the receptacle valve body. As this occurs, the poppet valves 94 and 114 of the nozzle and receptacle engage and move each other backwardly away from their respective valve seats to open up a flow passage through the nozzle and receptacle. When the nozzle is rotated such that the bearings 134 engage the end walls 43 of the helical channels, the poppet valves are in their fully open positions to minimize the pressure drop across the coupling device.

It should be appreciated that the bearings are also isolated from the fluid path when the nozzle is coupled to the receptacle.

During disconnect, the handle assembly is rotated in the opposite direction, and the bearings 134 ride down along the flights to move the nozzle outwardly from the receptacle. In so doing, the poppet valves 94, 114 close and the interface seal 82 on the nozzle valve body moves out of sealing contact with the receptacle valve body. The bearings 134 come to rest in the detents 44 along the length of the channels after the poppet valves are closed, which allows the coupling device to vent any remaining pressure between the poppet valves thru vent holes 140 before the nozzle is fully disconnected from the receptacle. Upon further rotation of the nozzle to cause the bearings to move out of the detents, the bearings exit the channels and the nozzle can be fully removed from the receptacle at zero pressure between the poppet valves.

As described above, the present invention provides an improved coupling device, particularly suitable for cryogenic fluids, which is robust, able to withstand harsh fueling environments, prevents spills, has a small size to reduce the clearance necessary for coupling the nozzle to the receptacle, and has many of the other features and advantages of prior coupling devices, and which is also simple and easy to manufacture and assemble; is easy to rebuild; and has an improved interface seal design with an extended service life. The coupling device also has a unique coupling structure which provides secure attachment of the nozzle to the receptacle, and allows venting of the coupling device before full disconnect.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A coupling device, comprising:
   a nozzle including a nozzle collar and handle assembly fixed together, and a valve body and fitting fixed together, the nozzle collar and handle assembly outwardly surrounding and rotatably supported with respect to the valve body and fitting, the valve body including an internal valve, and the collar having helical channels with entrance openings at a downstream end of the collar and opening outwardly along an exterior surface thereof; and
   a receptacle mateable with the nozzle, the receptacle also including a valve body including an internal valve, and a collar radially outwardly disposed from the valve body and defining therewith an annular cavity to receive the collar of the nozzle; the valve body of the nozzle being received in the valve body of the receptacle, the collar of the receptacle including a series of radial locking devices spaced along an interior surface of the collar and received in the helical channels of the nozzle to secure the nozzle to the receptacle when the nozzle is rotated in one direction with respect to the receptacle during connect, and wherein the channels have a geometry along their length which causes the radial locking devices to be retained along the channels in a vent position when the nozzle is rotated in an opposite direction with respect to the receptacle during disconnect.

2. The coupling device as in claim 1, wherein a pair of bushings rotatably support the nozzle collar and handle assembly with respect to the valve body and fitting, one of said bushings being disposed between the handle assembly and fitting, and the other of the bushings being disposed between the nozzle collar and the nozzle valve body.

3. The coupling device as in claim 2, wherein the handle assembly and nozzle collar are axially retained on the valve body and fitting by a retaining ring at one end of the handle assembly, and by cooperation between a shoulder of the nozzle valve body and a shoulder of the nozzle collar.

4. The coupling device as in claim 1, further including openings in the handle assembly of the nozzle to allow air circulation around an extent of the fitting.

5. The coupling device as in claim 1, further including a pair of interface sealing elements carried by the nozzle valve body and located between the nozzle valve body and the receptacle valve body to prevent fluid leakage therebetween.

6. The coupling device as in claim 5, wherein the seals are located between a shoulder on the nozzle valve body and a retaining ring, the retaining ring being removable to allow maintenance and servicing of the seals.

7. The coupling device as in claim 1, wherein the radial locking devices comprise roller bearings, removeably attached to the receptacle collar.

8. The coupling device as in claim 1, wherein the nozzle and receptacle are only mateable if they have property configured and cooperation radial locking devices and helical channels, to prevent the mating of an improper nozzle and receptacle.

9. A nozzle for the receptacle of a coupling device, the nozzle comprising a nozzle collar and handle assembly fixed together, and a valve body and fitting fixed together, the nozzle collar and handle assembly outwardly surrounding and rotatable with respect to a valve body and fitting, and the valve body including an internal valve; the collar having helical channels with entrance openings at an axial downstream end of the collar and opening outwardly along an exterior surface thereof for receipt of bearings from the receptacle; wherein the channels have a geometry along their length which causes the bearings to be retained along the channels in a vent position when the nozzle is rotated with respect to the receptacle during disconnect.

10. The nozzle as in claim 9, wherein a pair of bushings support the nozzle collar and handle assembly with respect to the valve body and fitting, one of said bushings being disposed between the handle assembly and fitting, and the other of the bushings being disposed between the nozzle collar and the nozzle valve body.

11. The nozzle as in claim 10, wherein the handle assembly and nozzle collar are axially retained on the valve body and fitting by a retaining ring at one end of the handle assembly, and by cooperation between a shoulder of the nozzle valve body and a shoulder of the nozzle collar.

12. The nozzle as in claim 9, further including openings in the handle assembly of the nozzle to allow air circulation around an extent of the fitting.

13. The nozzle as in claim 9, further including a pair of interface sealing elements carried by the nozzle valve body.

14. The nozzle as in claim 13, wherein the seals are located between a shoulder on the nozzle valve body and a retaining ring, the retaining ring being removable to allow maintenance and servicing of the seals.

15. A receptacle for the nozzle of a coupling device, the receptacle including a valve body including an internal poppet valve with a valve seat and a valve head, the valve head being spring biased against the valve seat, and a collar radially outwardly disposed from the valve body and defining therewith an annular cavity to receive a collar of the nozzle; the collar of the receptacle including a series of bearings spaced in discrete circumferential increments around an interior surface of the collar which can be received in helical channels of the nozzle to secure the nozzle to the receptacle when the receptacle is rotated in one direction with respect to the nozzle, and wherein the valve head of the poppet valve is accessible externally of the valve body by the nozzle when the nozzle is secured to the receptacle.

16. The receptacle as in claim 15, wherein the bearings project radially inward from the receptacle collar, and comprise an annular roller rotatably supported on a post affixed to the interior surface.

17. The receptacle as in claim 16, wherein the bearings are removeably attached to the receptacle collar.

18. The receptacle as in claim 15, wherein the collar includes a series of circumferentially-extended openings allowing air flow through the collar, the openings being located axially between the bearings at one end of the receptacle, and an opposite end of the receptacle.

19. The receptacle as in claim 15, wherein the valve body includes a series of openings around the circumference of the valve body to allow trapped air in the receptacle to vent to atmosphere.

* * * * *